(12) United States Patent
Matmour

(10) Patent No.: US 10,179,827 B2
(45) Date of Patent: Jan. 15, 2019

(54) METHOD FOR SYNTHESISING A DIENE POLYMER FUNCTIONALISED BY PENDANT EPOXIDE GROUPS ALONG THE CHAIN

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Rachid Matmour, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 16 days.

(21) Appl. No.: 15/105,384

(22) PCT Filed: Dec. 5, 2014

(86) PCT No.: PCT/EP2014/076699
§ 371 (c)(1),
(2) Date: Jun. 16, 2016

(87) PCT Pub. No.: WO2015/091020
PCT Pub. Date: Jun. 25, 2015

(65) Prior Publication Data
US 2016/0319061 A1    Nov. 3, 2016

(30) Foreign Application Priority Data
Dec. 19, 2013    (FR) ..................... 13 62946

(51) Int. Cl.
*C08F 236/10* (2006.01)
*C08C 19/25* (2006.01)
*C08L 9/06* (2006.01)
*C08L 15/00* (2006.01)

(52) U.S. Cl.
CPC ............ *C08F 236/10* (2013.01); *C08C 19/25* (2013.01); *C08L 9/06* (2013.01); *C08L 15/00* (2013.01)

(58) Field of Classification Search
CPC .......... C08F 236/10; C08C 19/25; C08L 9/06; C08L 15/00
USPC ......................................... 523/400
See application file for complete search history.

(56) References Cited

U.S. PATENT DOCUMENTS

2004/0097651 A1    5/2004    Musa

FOREIGN PATENT DOCUMENTS

| EP | 1422251 A2 | | 5/2004 | |
|---|---|---|---|---|
| JP | 2006188571 A | * | 7/2006 | ............ C08L 21/00 |
| JP | 2011-001404 A | * | 1/2011 | ............ C08G 59/20 |

OTHER PUBLICATIONS

Terakawa et al., JP 2006-188571 A machine translation in English, Jul. 20, 2006 (Year: 2006).*
Ozawa et al., JP 2011-001404 A machine translation in English, Jan. 6, 2011 (Year: 2011).*
Ranjit Malik, et al., Epoxy Graft Functionalization of Poly(Butadiene), Department of Chemistry, Rensslaer Polytechnic Institute, Troy, New York 12180, USA, 1997.
International Search Report dated Jun. 2, 2015.

* cited by examiner

*Primary Examiner* — David T Karst
(74) *Attorney, Agent, or Firm* — Dickinson Wright PLLC

(57) ABSTRACT

A method for synthesizing a modified polymer comprising epoxide groups along the polymer chain, by a hydrosilylation reaction of the unsaturations with a hydrosilane bearing an epoxide function in the presence of a suitable catalyst is provided. The method is simple, reproducible and able to be used on an industrial scale, and makes it possible to obtain high grafting yields, since they may reach 100%.

8 Claims, No Drawings

METHOD FOR SYNTHESISING A DIENE POLYMER FUNCTIONALISED BY PENDANT EPOXIDE GROUPS ALONG THE CHAIN

This application is a 371 national phase entry of PCT/EP2014/076699, filed 5 Dec. 2014, which claims benefit of French Patent Application No. 1362946, filed 19 Dec. 2013, the entire contents of which are incorporated herein by reference for all purposes.

BACKGROUND

1. Technical Field

The present invention relates to a method for synthesizing a modified polymer comprising epoxide groups along the polymer chain. More particularly, the present invention relates to obtaining these epoxidized polymers by functionalization of an unsaturated diene polymer. The invention also relates to the functional polymer obtained and the crosslinkable composition containing same.

2. Related Art

Polymers bearing epoxide functions are widely used in various applications for the reactivity of the epoxide function. They are mainly used in those fields of industry calling for elastomers having to be crosslinked in a way other than via sulphur.

The epoxide function may be borne directly by the carbon backbone of the diene polymer, and is then mainly obtained by epoxidation of the carbon-carbon double bonds initially present after copolymerization. This epoxidation of unsaturated polymers is well known to those skilled in the art and may be carried out for example by methods based on chlorohydrin or bromohydrin, methods for direct oxidation or methods based on hydrogen peroxide, alkyl hydroperoxides or peracids (such as peracetic acid or performic acid).

The epoxide function may also be pendant and is then already present in a monomer involved in the copolymerization with the other monomer(s) making up the polymer (this monomer may, for example, be glycidyl methacrylate, allyl glycidyl ether or vinyl glycidyl ether).

The use of a monomer already comprising the epoxide function for synthesizing the epoxidized polymer necessitates specific copolymerization operating conditions which limit the flexibility of the synthesis method. Indeed, some syntheses require very high pressures for gas phase radical copolymerizations of copolymers based on glycidyl methacrylate, for example terpolymers of ethylene, vinyl acetate and glycidyl (meth)acrylate (commercial products LOTADER AX8840® and AX8900® and Arkema patent EP0599684A1). Moreover, it is known to those skilled in the art that polar functions, such as glycidyl functions, can act as a poison to catalytic complexes used for the coordination-insertion polymerization of monomers.

The technical problem posed in light of the prior art is being able to have a method which enables simple and controlled synthesis of a polymer bearing epoxide functions along the chain, with a level of productivity in keeping with industrial production.

In the pursuit of their research, the inventors have now developed a novel method for synthesizing a polymer bearing pendant epoxide functions along the chain by grafting a hydrosilane bearing an epoxide function onto the unsaturations of the polymer by a hydrosilylation reaction. The grafting yield is high, possibly reaching 100% on the unsaturations. The method according to the invention is simple, reproducible and able to be used on an industrial scale.

Patent applications WO 2003/085024 A1, JP4586966B2, JP2006002035A, JP07133347A and JP05339504A report the use of hydrosilanes for introducing an epoxide function at the chain end of vinyl- or allyl-terminated polymers. Thus, after polymerization, functions at the chain end of polymers are modified by hydrosilylation using epoxide-functional hydrosilanes. In WO 2003/085024 A1, the authors dealt with the functionalization of allyl-terminated polyisobutylene. In documents JP4586966B2 and JP2006002035A, the authors dealt with the functionalization of vinyl-terminated polyimides and fluoropolyethers. In JP07133347A, the authors dealt with the functionalization of vinyl-terminated polysiloxanes. In JP05339504A, the authors dealt with the functionalization of allyl-terminated aromatic polyether. These modifications by hydrosilylation require the polymer to be exclusively non-diene and end-functionalized beforehand by an allyl or vinyl group. Moreover, this does not concern the synthesis of polymers bearing epoxide functions along the chain.

SUMMARY

Consequently, a first subject of the invention relates to a method for synthesizing a diene polymer comprising epoxide functions along the chain, characterized in that it comprises the step of modifying, by hydrosilylation, an unsaturated polymer comprising unsaturations along the chain, by reacting the unsaturated polymer with an epoxidized hydrosilane of formula I in the presence of a catalyst:

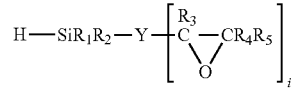

Formula I with

R$_1$ and R$_2$, which are identical or different, each being a C$_1$-C$_5$ alkyl group, C$_6$-C$_{14}$ aryl group or C$_7$-C$_{11}$ alkylaromatic group;

R$_3$, R$_4$ and R$_5$, which are identical or different, each being a hydrogen atom or a C$_1$-C$_5$ alkyl group, C$_6$-C$_{14}$ aryl group or C$_7$-C$_{11}$ alkylaromatic group;

Y being a bridging group with a valency equal to i+1; and i being an integer from 1 to 3.

Another subject of the invention is the diene polymer comprising epoxide functions along the chain which can be obtained by the method which is also a subject of the invention.

Another subject of the invention is a rubber composition comprising such a polymer.

DETAILED DESCRIPTION OF EXAMPLE EMBODIMENTS

In the present description, any interval of values denoted by the expression "between a and b" represents the range of values extending from more than a to less than b, (i.e. excluding the limit values a and b) whereas any interval of values denoted by the expression "from a to b" means the range of values extending from a to b (i.e. including the strict limit values a and b).

In the present description, when reference is made to a "predominant" compound, this is understood within the context of the present invention to mean that this compound is predominant among the compounds of the same type in the composition; that is to say that it is that compound which represents the greatest amount by weight among the compounds of the same type. Thus, for example, a predominant elastomer is the elastomer representing the greatest weight relative to the total weight of elastomers in the composition. Similarly, a filler referred to as "predominant" is that filler which represents the greatest weight among the fillers of the composition. By way of example, in a system comprising just one elastomer, this elastomer is predominant within the context of the present invention, and, in a system comprising two elastomers, the predominant elastomer represents more than half the weight of the elastomers.

On the other hand, a "minor" compound is a compound which does not represent the greatest fraction by weight among the compounds of the same type.

In the present description, the expression "along the chain", when referring to a pendant group of the polymer or an unsaturation, must be understood to mean that the polymer comprises pendant groups of this type or unsaturations at several places on the chain. This includes the end(s) of the chain but is not limited to these locations. When a group or unsaturation is present at at least one chain end, the polymer also comprises at least one other pendant group of this type or, respectively, one other unsaturation, at another position in the chain.

In the present description, the expression "graft" must be understood to mean the side group fixed to the main chain of the polymer, which arises from grafting by hydrosilylation of the epoxidized hydrosilane.

The expressions "epoxidized", "epoxide-functional" or "epoxy-functional" are used in the present description as equivalent interchangeable expressions.

Thus, a first subject of the invention is a method for synthesizing a diene polymer comprising pendant epoxide functions along the chain, consisting in modifying a polymer comprising unsaturations along the chain, by a hydrosilylation reaction in the presence of an epoxidized hydrosilane of formula I and of a catalyst.

The invention comprises the following separate variants which may be combined with one another, relating to the nature of the hydrosilane of formula I.

In formula I, when $R_x$ denotes an alkyl radical, the latter comprises 1 to 5 carbon atoms, preferably 1 to 4 carbon atoms, more preferably 1 to 3 carbon atoms. Mention may be made, by way of example, of methyl, ethyl and propyl radicals.

In formula I, when $R_x$ denotes an aryl radical, the latter comprises 6 to 14 carbon atoms. Mention may be made, by way of example, of phenyl, naphthyl and anthracenyl radicals.

In formula I, when $R_x$ denotes an alkylaromatic radical, the latter comprises 7 to 11 carbon atoms. Mention may be made, by way of example, of benzyl, tolyl and xylyl radicals.

According to some variants, in formula I, $R_3$, $R_4$ and $R_5$ are preferably identical and represent a hydrogen atom.

According to other variants, in formula I, $R_1$ and $R_2$, which are identical or different, preferably denote a $C_1$-$C_5$ alkyl group.

According to yet other variants, in formula I, Y preferably represents a linear, branched or cyclic hydrocarbon-based chain which may contain one or more aromatic radicals and/or one or more heteroatoms, such as for example N, O or Si. According to a preferred embodiment, the bridging group Y is a linear or branched $C_1$-$C_{24}$, preferably $C_1$-$C_{10}$, alkyl chain, optionally interrupted by one or more silicon and/or oxygen atoms. More preferably, Y is a linear $C_1$-$C_6$ alkyl chain interrupted by one or more silicon and/or oxygen atoms. When the hydrocarbon-based chain Y comprises at least one silicon atom, the latter may preferably be substituted by at least one $C_1$-$C_4$ alkyl radical, preferably methyl or ethyl. When the hydrocarbon-based chain Y comprises at least one oxygen atom, the latter is preferably separated from the epoxy group by a methylene group.

In formula I, i is preferably 1.

According to some particularly advantageous variants, the epoxidized hydrosilane which may be used within the context of the method of the invention has at least one of the four following characteristics, preferably all four:

$R_1$ and $R_2$, which are identical or different, denote a $C_1$-$C_5$ alkyl radical, preferably methyl and ethyl, $R_3$, $R_4$ and $R_5$ are identical and represent a hydrogen atom, Y is a linear $C_1$-$C_6$ alkyl chain interrupted by at least one oxygen atom separated from the epoxy group by a methylene group and by at least one silicon atom substituted by two identical or different $C_1$-$C_5$ alkyl radicals, preferably methyl and ethyl, i is 1.

Thus, it is possible to use, as molecules to be grafted within the context of the invention, silanes such as, for example, (3-glycidoxypropyl)-1,1,3,3-tetramethyldisiloxane (formula A), 2,4,4-trimethyl-8-(2-oxiranyl)-3,7-dioxa-2,4-disilaoctane (formula B), 6-ethyl-6,8-dimethyl-1-(2-oxiranyl)-2,7-dioxa-6,8-disiladecane (formula C), etc.

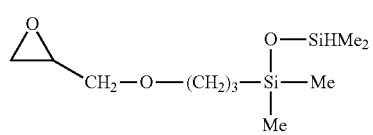

Formula A

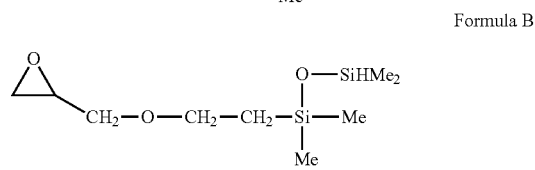

Formula B

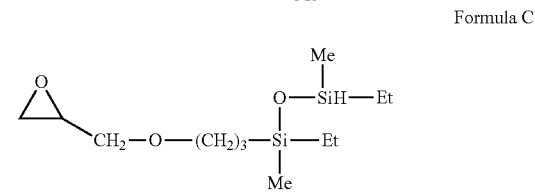

Formula C

Among the epoxide-functional hydrosilane derivatives which may be used within the context of the invention, some may be found commercially such as, for example, the compound of formula A which is sold by ABCR or Gelest.

Thus, according to the invention, the hydrosilane described above reacts by hydrosilylation with the unsaturations of an unsaturated diene polymer.

The term "diene polymer" must be understood according to the invention as any polymer derived at least in part (i.e. a homopolymer or a copolymer) from diene monomers (monomers bearing two conjugated or non-conjugated carbon-carbon double bonds). The diene polymer according to the invention comprises unsaturations of carbon-carbon double bond type. The polymer according to the invention preferably has, among other unsaturations, pendant unsaturations along the chain. According to certain variants, these pendant unsaturations are referred to as unsaturations of vinyl origin. Unsaturations of vinyl origin refers to unsaturations which are pendant to the polymer chain and which arise from an insertion, of vinyl type, of the diene monomer into the polymer. By way of examples of unsaturations of vinyl origin, mention may be made of those arising from a 1,2-type insertion, for example of butadiene, isoprene or any other diene which has a C1 unsaturation, or else from 3,4-type insertions, of isoprene for example, etc.

The unsaturated polymer according to the invention may belong to any category of diene polymers derived at least in part from conjugated or non-conjugated diene monomers. This is any type of polymer within the meaning known to those skilled in the art, whether thermoplastic or elastomeric in nature, with the proviso that this polymer is unsaturated. Preferably, the unsaturated diene polymer is selected from the diene elastomers.

The unsaturated diene polymer according to the invention has unsaturations along the chain. The content by weight of the monomer units bearing these unsaturations varies within a broad range which makes it possible to encompass different categories of polymers. Thus, the diene polymers which are suitable for use in the method of the invention may be slightly unsaturated with a content by weight of unsaturated monomer units of at least 1% relative to the total weight of the polymer. According to some variants, this content may then be at least 5 wt % or even at least 10 wt %. The diene polymers which are suitable for use in the method of the invention may also be highly unsaturated, with a content by weight of unsaturated monomer units of greater than 20% and possibly reaching up to 100% relative to the total weight of the polymer. According to certain variants, this content may then be at least 40% and even at least 50%. When the content by weight of the monomer units bearing unsaturations is less than 1%, the targeted technical effect of the epoxidized polymer risks being insufficient.

According to some preferred variants, any diene polymer comprising at least some unsaturated units, part of which derives from an insertion of the conjugated or non-conjugated diene monomer giving rise to a pendant unsaturation, is suitable according to the invention, especially, according to certain of these variants, any diene polymer comprising at least some unsaturated units, part of which derives from a vinyl insertion.

The term "diene polymer able to be used in the invention" is more particularly understood as a diene polymer corresponding to one of the following categories:

(a) any homopolymer obtained by polymerization of a conjugated diene monomer having from 4 to 12 carbon atoms;

(b) any copolymer obtained by copolymerization of one or more of the conjugated dienes mentioned above with one another or with one or more ethylenically unsaturated monomers;

(c) any homopolymer obtained by polymerization of a non-conjugated diene monomer having from 5 to 12 carbon atoms;

(d) any copolymer obtained by copolymerization of one or more non-conjugated dienes mentioned above with one another or with one or more ethylenically unsaturated monomers;

(e) a ternary copolymer obtained by copolymerization of ethylene, an α-olefin having from 3 to 6 carbon atoms and a non-conjugated diene monomer having from 6 to 12 carbon atoms, such as for example the elastomers obtained from ethylene, propylene and a non-conjugated diene monomer, as described in particular in the documents WO 2004/035639A1 and US 2005/0239639A1;

(f) a copolymer of isobutene and isoprene (butyl rubber) and the halogenated versions, in particular chlorinated or brominated versions, of this type of copolymer;

(g) natural rubber;

(h) an unsaturated olefinic copolymer, the chain of which comprises at least olefinic monomer units, that is to say units derived from the insertion of at least one mono-olefin, and diene units derived from at least one conjugated diene;

(i) a mixture of several of the elastomers defined in (a) to (h) with one another.

By way of conjugated diene monomer suitable for synthesizing polymers (a), (b) and (h), mention may be made of 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

By way of non-conjugated diene monomer suitable for synthesizing polymers (c), (d) and (e), mention may be made of 1,4-pentadiene, 1,4-hexadiene, ethylidenenorbornene and dicyclopentadiene.

By way of ethylenically unsaturated monomers able to be used in the copolymerization with one or more conjugated or non-conjugated diene monomers to synthesize copolymers (b) or (d), mention may be made of:

vinylaromatic compounds having from 8 to 20 carbon atoms, such as, for example, styrene, ortho-, meta- or para-methylstyrene, the commercial vinylmesitylene mixture, divinylbenzene and vinylnaphthalene;

vinyl nitrile monomers having 3 to 12 carbon atoms, such as, for example, acrylonitrile and methacrylonitrile;

acrylic ester monomers derived from acrylic acid or methacrylic acid with alcohols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate and isobutyl methacrylate.

Copolymers (b) or (d) may contain between 99% by weight and 1% by weight of diene units and between 1% by weight and 99% by weight of vinylaromatic, vinyl nitrile and/or acrylic ester units.

By way of mono-olefin monomer suitable for synthesizing polymers (h), mention may be made of ethylene or an α-olefin having from 3 to 6 carbon atoms, for example propylene. Preferably, the mono-olefin monomer is ethylene.

According to certain variants, the olefinic copolymer (h) able to be used in the method of the invention is a copolymer, the chain of which comprises olefinic monomer units, that is to say units derived from the insertion of at least one mono-olefin, and diene units derived from at least one conjugated diene. According to other variants, the units are not entirely units derived from diene monomers and mono-olefinic monomers. According to these variants, other units derived for example from an ethylenically unsaturated monomer as described above are present in the carbon-based chain.

According to certain variants, the olefinic monomer units in polymer (h) are predominant; more preferably, the molar content of these units is greater than 50% relative to the polymer. Among these variants, the molar content may be at least 65% and at most 95%, or even at most 85%. Such elastomers and the methods of synthesis thereof are described in applications EP 1 092 731, EP 1 554 321, EP 1 656 400, EP 1 954 705, EP 1 957 506 and FR 13/50557, in the name of the applicants.

Among the diene polymers derived from at least one conjugated diene monomer used in the context of the modification method according to embodiments of the invention, mention may be made, as non-exclusive examples, of polybutadiene, polyisoprene or polychloroprene and their hydrogenated versions, polyisobutylene, block copolymers of butadiene and isoprene with styrene and their hydrogenated versions, such as poly(styrene-b-butadiene) (SB), poly(styrene-b-butadiene-b-styrene) (SBS), poly(styrene-b-isoprene-b-styrene) (SIS), poly[styrene-b-(isoprene-stat-butadiene)-b-styrene] or poly(styrene-b-isoprene-b-butadiene-b-styrene) (SIBS), hydrogenated SBS (SEBS), poly(styrene-b-butadiene-b-methyl methacrylate) (SBM) and also its hydrogenated version (SEBM), random copolymers of butadiene with styrene (SBR) and acrylonitrile (NBR) and their hydrogenated versions, random copolymers of isoprene with styrene (SIR) and their hydrogenated versions, random copolymers of isoprene and butadiene with styrene (SBIR) and their hydrogenated versions, butyl or halogenated rubbers, ethylene-propylene-diene terpolymers (EPDM), ethylene-diene copolymers and mixtures thereof.

Among the above, the diene polymer(s) are most particularly selected from the group of the diene polymers consisting of polybutadienes (abbreviated to "BR"), synthetic polyisoprenes (IR), natural rubber (NR), butadiene copolymers, isoprene copolymers, ethylene-diene copolymers and mixtures of these polymers. Such copolymers are more preferably selected from the group consisting of butadiene-styrene copolymers (SBR), isoprene-butadiene copolymers (BIR), isoprene-styrene copolymers (SIR), isoprene-butadiene-styrene copolymers (SBIR) and ethylene-butadiene copolymers (EBR).

The polymers which may be used may be obtained according to conventional polymerization techniques well known to those skilled in the art. The polymers may have any microstructure which is a function of the polymerization conditions used, especially of the presence or absence of a modifying and/or randomizing agent and the amount thereof. The polymers may for example be block, random, sequential or microsequential, and be prepared in dispersion, emulsion or solution; they may be coupled and/or star-branched or else functionalized with a suitable functionalization agent.

Before the reaction for grafting by hydrosilylation, the method comprises dissolving at least one unsaturated diene polymer, an epoxide-functional hydrosilane and a hydrosilylation catalyst in a non-polar solvent. This dissolving may be carried out according to any procedure at the disposal of those skilled in the art. According to one embodiment, the unsaturated polymer, the epoxide-functional hydrosilane and the catalyst are dissolved in the non-polar solvent with stirring.

By way of non-polar solvent, use may be made according to the method of any inert hydrocarbon-based solvent, which may be, for example, an aliphatic or alicyclic hydrocarbon, such as pentane, hexane, heptane, isooctane, cyclohexane or methylcyclohexane, or an aromatic hydrocarbon, such as benzene, toluene or xylene, and also mixtures thereof. Preferably, methycyclohexane or toluene is used.

By way of catalyst, use may be made of any catalyst known for the catalysis of hydrosilylation which is based on transition metals, generally from Group VIII, such as platinum, palladium, rhodium, ruthenium, iron, etc. Among these various catalysts employed for the hydrosilylation reaction, platinum-based catalysts will preferably be chosen, such as hexachloroplatinic acid hexahydrate (Speier's catalyst) and platinum-1,1,3,3-tetramethyl-1,3-divinylsiloxane (Karstedt's catalyst), and more preferably Karstedt's catalyst. The catalyst may be added to the reaction mixture in any customary form, however, preferably in the form of a solution in a solvent.

Preferably, the amount of total solvent, or of solvent of the reaction medium, is such that the concentration by weight of polymer is between 1% and 40% by weight, preferably between 2% and 20% and even more preferably between 2% and 10% in said solvent. The term total solvent, or of solvent of the reaction medium, is understood to mean all the solvents used to dissolve the unsaturated polymer, the epoxide-functional hydrosilane and the hydrosilylation catalyst.

The method may advantageously comprise a step of heating the homogeneous reaction mixture obtained in the previous step to the temperature of the grafting reaction. The temperature of the grafting reaction is at least 20° C. and at most 120° C.; preferably it is at least 50° C., or even at least 60° C.; and at most 100° C., or even at most 90° C.

The degree of grafting may be adjusted in a manner known by those skilled in the art, by varying various operating conditions, such as especially the amount of molecules to be grafted, the reaction temperature or else the reaction time. It is possible to achieve quantitative grafting yields.

Thus, the degree of grafting is preferably at least 0.1 mol % of grafts relative to the modified polymer. The degree of grafting is preferably at most 50 mol % of grafts relative to the modified polymer, and according to certain variants the degree of grafting is less than 20 mol % of grafts relative to the modified polymer.

It is appropriate to note that in the context of the invention the preferred aspects and variants described above may be combined with one another.

The method for grafting defined in this way makes it possible to achieve significantly raised grafting yields, varying from 30% to 100%, or even, depending on specific embodiments, yields varying from 70% to 100%, or even from 80% to 100%, and in relatively short periods of time, especially compared to an epoxidation reaction. Indeed, according to certain variants, the reaction times may be reduced at least tenfold.

The method makes it possible to synthesize a diene polymer comprising epoxide functions along the chain. This diene polymer comprises units (that is to say at least two, at least one of which is situated in the chain, as opposed to the position at the chain end) bearing a pendant epoxide function along the chain which is connected to the latter by means of a silicon atom.

More particularly, these epoxidized units bear a pendant epoxide function along the chain corresponding to formula II:

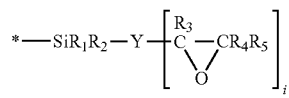

Formula II with
$R_1$, $R_2$, $R_3$, $R_4$ and $R_5$, and also Y and I, being as defined above, including the advantageous or preferred variants, and
* denoting a connection point with the polymer chain.

Thus, according to certain particularly advantageous variants, these epoxidized units bear a pendant epoxide function along the chain according to one of the following formulae A', B' and C':

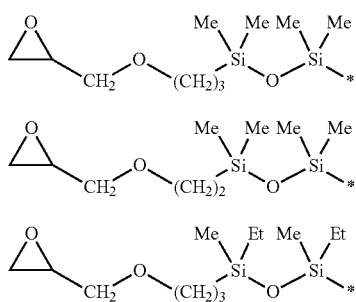

* denoting in each of these formulae a connection point with the polymer chain.

According to some variants, the epoxidized diene polymer comprises units bearing a pendant epoxide function along the chain which is connected to the latter by means of a silicon atom, at a molar content of at least 0.1% and of at most 50%. In light of certain applications, this content is preferably at most 20 mol %, more preferably at most 10 mol %. The epoxidized diene polymer therefore comprises non-epoxidized units according to a molar content of at most 99.9%. According to certain applications, this content of non-epoxidized units is preferably at least 80 mol %. These molar contents are measured relative to the sum total of the polymer.

In the event that the units present in the carbon-based chain comprise non-epoxidized units, several separate variants which may be combined with one another may be envisaged.

Thus, according to some variants, these non-epoxidized units comprise units derived from at least one conjugated or non-conjugated diene monomer, as described above. By way of specific conjugated diene monomer, mention may especially be made of butadiene and isoprene.

According to other variants, these non-epoxidized units comprise units which may be derived from at least one mono-olefin as described above. In this regard, mention may be made of ethylene, propylene, butylene or isobutylene, and more particularly ethylene.

According to yet other variants, the non-epoxidized units comprise units derived from at least one ethylenically unsaturated monomer. In this regard, mention may be made of vinylaromatic monomers having from 8 to 20 carbon atoms, vinyl nitrile monomers having from 3 to 12 carbon atoms and acrylic ester monomers derived from acrylic acid or methacrylic acid with an alcohol having from 1 to 12 carbon atoms, as described above. In this regard, mention may more particularly be made of styrene.

Another subject of the invention is a crosslinkable rubber composition comprising this epoxide-functional polymer as described above or prepared by hydrosilylation according to the method described above.

The diene polymers grafted may be used as is, or in mixtures with one or more other compounds. The presence of epoxide groups grafted along the chain makes it possible to envisage use in similar applications to the diene polymers functionalized by these same epoxide groups.

For example, it is known, for optimizing interactions between the elastomer and the reinforcing filler within a reinforced rubber composition, to modify the nature of the diene elastomers in order to introduce functional groups therein. Thus, the specific structure of the grafted polymer makes it possible to envisage the use thereof in the manufacture of various products based on reinforced rubber, as a function of the nature of the grafted epoxidized hydrosilane derivative.

It is also known that the epoxide groups have a most specific reactivity with certain compounds. It is thus possible to envisage use of the grafted polymer in applications in which such reactivity is necessary.

In the field of tires, especially for vehicles, the uses mentioned above may be envisaged. It is for this reason that a tire, one of the constituent elements of which comprises a rubber composition based on an epoxidized diene polymer described above in terms of its structure or its method of synthesis, is also a subject of the invention.

The abovementioned characteristics of the present invention, and others, will be better understood on reading the following description of several illustrative and nonlimiting exemplary embodiments of the invention.

Exemplary Embodiment of the Invention

Measurements Used

The elastomers are characterized, before curing, as indicated below.

Size-Exclusion Chromatography

Size-exclusion chromatography (SEC) is used. SEC makes it possible to separate macromolecules in solution on the basis of their size through columns filled with a porous gel. The macromolecules are separated on the basis of their hydrodynamic volume, with the bulkiest being eluted first.

Although not an absolute method, SEC makes it possible to discern the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.

Preparation of the polymer: There is no specific treatment of the polymer sample before analysis. The latter is simply dissolved in tetrahydrofuran+1 vol % distilled water at a concentration of approximately 1 g/l. The solution is then filtered through a filter with a porosity of 0.45 μm before injection.

SEC analysis: The apparatus used is a Waters Alliance chromatograph. The elution solvent is tetrahydrofuran. The flow rate is 0.7 ml/min, the temperature of the system is 35° C. and the analytical time is 90 min. A set of four Waters columns in series, with the Styragel HMW7, Styragel HMW6E and Styragel HT6E (two) trade names, is used.

The volume of the solution of the polymer sample injected is 100 μl. The detector is a Waters 2410 differential refractometer and the software for making use of the chromatographic data is the Waters Empower system.

The average molar masses calculated are relative to a calibration curve produced using PSS ReadyCal Kit commercial polystyrene standards.

Glass Transition Temperature

The glass transition temperatures Tg of the polymers are measured by means of a differential scanning calorimeter. Analysis is carried out according to the requirements of standard ASTM D3418-08.

Nuclear Magnetic Resonance Spectroscopy

The contents of the various monomer units and their microstructures within the copolymer are determined by NMR analysis. The spectra are acquired on a 500 MHz Bruker spectrometer fitted with a BBI z-gradient 5 mm broadband probe. The quantitative $^1$H NMR experiment uses a simple 30° pulse sequence and a repetition time of 5 seconds between each acquisition. The samples are dissolved in CDCl$_3$.

Exemplary Embodiments of the Invention

Starting Polymers Used:

Butadiene-styrene copolymer SBR1 prepared in solution, having the following microstructural characteristics determined by $^1$H NMR:
  Content by weight of 1,2-(vinyl) units/PB: 24.2%
  Content by weight of styrene units/SBR: 27.8%

This polymer has a molecular mass Mn=118 300 g/mol and a PI=1.07 and a Tg of −47° C. (with DT=7).

Butadiene-styrene copolymer SBR2 prepared in solution, having the following microstructural characteristics determined by $^1$H NMR:
  Content by weight of 1,2-(vinyl) units/PB: 58.7%
  Content by weight of styrene units/SBR: 27.2%

This polymer has a molecular mass Mn=120 348 g/mol, a PI=1.89 and a Tg of −23.8° C. (with DT=6).

Butadiene-ethylene copolymer EBR1 prepared in solution in accordance with patent EP 1 954 705 B1, having the following microstructural characteristics determined by $^1$H NMR:
  Content by weight of ethylene units: 51.6%
  Content by weight of 1,2-(vinyl) units: 41.9%
  Content by weight of 1,4-units: 22%
  Content by weight of cyclic units: 36.1%

This polymer has a molecular mass Mn=141 744 g/mol, a PI=1.65 and a Tg of −44.2° C. (with DT=5).

| EBR1 | % by weight | Mol % |
|---|---|---|
| % PB1-2/PB | 41.9 +/− 1.5 | 51.3 +/− 1.5 |
| % PB1-4/PB | 22.0 +/− 1.5 | 26.9 +/− 1.5 |
| % Cyclic units/PB | 36.1 +/− 1.5 | 21.7 +/− 1.5 |
| % PE/EBR | 51.6 +/− 1.5 | 71.6 +/− 1.5 |

Treatment Applied to this Starting Elastomer:

The starting polymer is subjected to an antioxidant treatment by adding 0.4 parts per hundred parts of elastomers (phr) of 4,4'-methylenebis(2,6-di(tert-butyl)phenol) and 0.4 parts per hundred parts of elastomers (phr) of N-(1,3-dimethylbutyl)-N'-phenyl-p-phenylenediamine.

Epoxide-Functional Silane Used:
(3-Glycidoxypropyl)-1,1,3,3-tetramethyldisiloxane of formula:

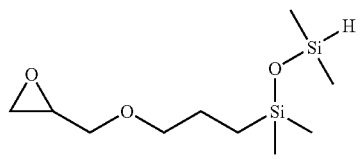

Example 1

2 g of SBR1 are dissolved in 100 ml of toluene in a 250 ml reactor fitted with a mechanical stirrer. 4.05 mmol (1 g) of (3-glycidoxypropyl)-1,1,3,3-tetramethyldisiloxane and 200 ml of platinum-1,1,3,3-tetramethyl-1,3-divinylsiloxane in solution in xylene (Karstedt's catalyst) (CAS No.: 68478-92-2) are added to the polymer solution and the reaction medium is heated to 60° C.

After 2 hours at 60° C. with stirring, the reaction medium is allowed to return to room temperature. Once at room temperature, the reaction medium is then coagulated from 250 ml of methanol and then rinsed with 250 ml of methanol.

The redissolved polymer is then subjected to an antioxidant treatment of 0.4 parts per hundred parts of elastomers (phr) of 4,4'-methylenebis(2,6-di(tert-butyl)phenol) and 0.4 part per hundred parts of elastomers (phr) of N-(1,3-dimethylbutyl)-N'-phenyl-p-phenylenediamine.

The functionalized SBR is dried by stoving under vacuum (200 torr) at 60° C. for 1 day.

The reaction is monitored by $^1$H NMR spectroscopy and confirmed by the reduction in or disappearance of signals for the vinyl unsaturations (d=4.9 ppm: =C$\underline{H}_2$) and the increase in or presence of signals for the epoxide group (d=3.08 ppm: —C$\underline{H}$—O—). The content of grafted function determined by $^1$H NMR spectroscopy is 11.9 mol % over the whole of the copolymer. The grafting yield is 95%.

Distribution of each of the units over the whole of the copolymer:

| SBR1-Control | % by weight | Mol % |
|---|---|---|
| % Styrene | 27.8 +/− 1.5 | 16.7 +/− 1.5 |
| % PB1-2 | 14.7 +/− 0.5 | 20.1 +/− 0.5 |
| % PB1-4 | 54.8 +/− 0.5 | 63.2 +/− 0.5 |
| % Silane | / | / |

| Modified SBR1 | % by weight | Mol % |
|---|---|---|
| % Styrene | 20.6 +/− 1.5 | 17.9 +/− 1.5 |
| % PB1-2 | 4.7 +/− 0.5 | 7.9 +/− 0.5 |
| % PB1-4 | 37.7 +/− 0.5 | 63.1 +/− 0.5 |
| % Silane | 36.9 +/− 0.5 | 11.0 +/− 0.5 |

Example 2

2 g of SBR2 are dissolved in 100 ml of toluene in a 250 ml reactor fitted with a mechanical stirrer. 4.5 mmol (1.12 g) of (3-glycidoxypropyl)-1,1,3,3-tetramethyldisiloxane and 200 ml of platinum-1,1,3,3-tetramethyl-1,3-divinylsiloxane in solution in xylene (Karstedt's catalyst) (CAS No.: 68478-92-2) are added to the polymer solution and the reaction medium is heated to 60° C.

After 2 hours at 60° C. with stirring, the reaction medium is allowed to return to room temperature. Once at room temperature, the reaction medium is then coagulated from 250 ml of methanol and then rinsed with 250 ml of methanol.

The redissolved polymer is then subjected to an antioxidant treatment of 0.4 parts per hundred parts of elastomers (phr) of 4,4'-methylenebis(2,6-di(tert-butyl)phenol) and 0.4 parts per hundred parts of elastomers (phr) of N-(1,3-dimethylbutyl)-N'-phenyl-p-phenylenediamine.

The functionalized SBR is dried by stoving under vacuum (200 torr) at 60° C. for 1 day.

The reaction is monitored by $^1$H NMR spectroscopy and confirmed by the reduction in or disappearance of signals for the vinyl unsaturations (d=4.9 ppm: =C$\underline{H}_2$) and the increase in or presence of signals for the epoxide group (d=3.08 ppm: —C$\underline{H}$—O—). The content of grafted function determined by $^1$H NMR spectroscopy is 14.4 mol % over the whole of the copolymer. The grafting yield is 96%.

Distribution of each of the units over the whole of the copolymer:

| SBR2-Control | % by weight | Mol % |
|---|---|---|
| % Styrene | 27.2 +/− 1.5 | 16.2 +/− 1.5 |
| % PB1-2 | 42.8 +/− 0.5 | 49.2 +/− 0.5 |
| % PB1-4 | 30.1 +/− 0.5 | 34.6 +/− 0.5 |
| % Silane | / | / |

| Modified SBR2 | % by weight | Mol % |
|---|---|---|
| % Styrene | 17.5 +/− 1.5 | 16.5 +/− 1.5 |
| % PB1-2 | 19.2 +/− 0.5 | 34.4 +/− 0.5 |
| % PB1-4 | 18.9 +/− 0.5 | 34.8 +/− 0.5 |
| % Silane | 44.5 +/− 0.5 | 14.4 +/− 0.5 |

Example 3

2 g of EBR1 are dissolved in 100 ml of toluene in a 250 ml reactor fitted with a mechanical stirrer. 4.94 mmol (1.37 ml) of (3-glycidoxypropyl)-1,1 tetramethyldisiloxane and 200 ml of platinum-1,3,3-tetramethyl-1,3-divinylsiloxane in solution in xylene (Karstedt's catalyst) (CAS No.: 68478-92-2) are added to the polymer solution and the reaction medium is heated to 60° C.

After 2 hours at 60° C. with stirring, the reaction medium is allowed to return to room temperature. Once at room temperature, the reaction medium is then coagulated from 250 ml of methanol and then rinsed with 250 ml of methanol.

The polymer is then subjected to an antioxidant treatment of 0.4 parts per hundred parts of elastomers (phr) of 4,4'-methylenebis(2,6-di(tert-butyl)phenol) and 0.4 part per hundred parts of elastomers (phr) of N-(1,3-dimethylbutyl)-N'-phenyl-p-phenylenediamine.

The functionalized SBR is dried by stoving under vacuum (200 torr) at 60° C. for 1 day.

The reaction is monitored by $^1$H NMR spectroscopy and confirmed by the reduction in or disappearance of signals for the vinyl unsaturations (d=4.9 ppm: =C$\underline{H}_2$) and the increase in or presence of signals for the epoxide group (d=3.08 ppm: —C$\underline{H}$—O—). The content of grafted function determined by $^1$H NMR spectroscopy is 9.4 mol % over the whole of the copolymer. The grafting yield is 96%.

Distribution of each of the units over the whole of the copolymer:

| EBR1-Control | % by weight | Mol % |
|---|---|---|
| % PB1-2 | 20.3 +/− 1.5 | 14.6 +/− 1.5 |
| % PB1-4 | 10.6 +/− 1.5 | 7.6 +/− 1.5 |
| % Cyclic units | 17.5 +/− 1.5 | 6.2 +/− 1.5 |
| % PE | 51.6 +/− 1.5 | 71.6 +/− 1.5 |

| Modified EBR1 | % by weight | Mol % |
|---|---|---|
| % PB1-2 | 4.6 +/− 1.5 | 5.2 +/− 1.5 |
| % PB1-4 | 6.7 +/− 1.5 | 7.7 +/− 1.5 |
| % Cyclic units | 10.2 +/− 1.5 | 5.7 +/− 1.5 |
| % PE | 32.5 +/− 1.5 | 71.9 +/− 1.5 |
| % Silane | 46.1 +/− 1.5 | 9.4 +/− 0.5 |

The invention claimed is:

1. A rubber composition comprising: at least one elastomer including units bearing a pendant epoxide functions along the chain which is connected to the latter by means of a silicon atom, and at least one reinforcing filler, wherein the pendant epoxide function along the chain corresponds to formula II:

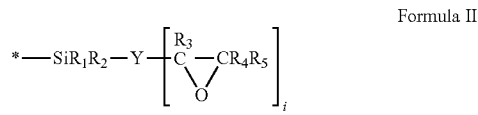

Formula II with

R$_1$ and R$_2$, which are identical or different, each being a C$_1$-C$_5$ alkyl group, C$_6$-C$_{14}$ aryl group or C$_7$-C$_{11}$ alkylaromatic group;

R$_3$, R$_4$ and R$_5$, which are identical or different, each being a hydrogen atom or a C$_1$-C$_5$ alkyl group, C$_6$-C$_{14}$ aryl group or C$_7$-C$_{11}$ alkylaromatic group;

Y being a bridging group with a valency equal to i+1; and i being an integer from 1 to 3;

* denoting a connection point with the polymer chain.

2. A tire comprising a rubber composition according to claim 1.

3. The rubber composition according to claim 1, wherein Y is a linear, branched or cyclic hydrocarbon-based chain which may contain one or more aromatic radicals and/or one or more heteroatoms.

4. The rubber composition according to claim 1 comprising the units bearing a pendant epoxide function along the chain which is connected to the latter by means of a silicon atom, at a molar content of at least 0.1% and of at most 20%, and non-epoxidized units at a molar content of at most 99.9% and of at least 80%, the molar contents being measured relative to the polymer.

5. The rubber composition according to claim 1, wherein the non-epoxidized units comprise units derived from at least one conjugated diene monomer.

6. The rubber composition according to claim 1, wherein the non-epoxidized units comprise units derived from at least one mono-olefin.

7. The rubber composition according to claim 1, wherein the non-epoxidized units comprise units derived from at least one ethylenically unsaturated monomer.

8. The rubber composition according to claim 1, wherein R$_3$, R$_4$ and R$_5$ are each a hydrogen atom; and i is 1.

* * * * *